United States Patent
Lazar

[11] Patent Number: 6,122,859
[45] Date of Patent: Sep. 26, 2000

[54] PLANT TIE AND METHOD

[75] Inventor: Joshua Lazar, Quebec, Canada

[73] Assignee: Filterco Enterprises Inc., Montreal, Canada

[21] Appl. No.: 09/153,613

[22] Filed: Sep. 15, 1998

[51] Int. Cl.⁷ .................................................. A01G 17/04
[52] U.S. Cl. .............................................................. 47/44
[58] Field of Search ................................ 47/44, 46, 47, 47/41.01; 24/178, 301

[56] References Cited

U.S. PATENT DOCUMENTS

| | | |
|---|---|---|
| 409,001 | 8/1889 | Ashworth . |
| D. 413,693 | 9/1999 | Minnelli .................................. D28/41 |
| 1,030,661 | 6/1912 | Inge ........................................ 24/17 B |
| 2,314,779 | 3/1943 | Fuhmann . |
| 2,648,879 | 8/1953 | Patterson ..................................... 47/44 |
| 2,680,272 | 6/1954 | Radtke . |
| 2,845,670 | 8/1958 | Brown et al. . |
| 3,026,587 | 3/1962 | Spencer . |
| 3,131,444 | 5/1964 | Manning . |
| 3,226,882 | 1/1966 | Lichtenthaler . |
| 3,324,592 | 6/1967 | Prenner et al. .............................. 47/47 |
| 3,875,620 | 4/1975 | Wells et al. . |
| 4,569,108 | 2/1986 | Schwab ..................................... 24/301 |
| 4,576,664 | 3/1986 | Delahunty . |
| 4,907,369 | 3/1990 | Vomfell ...................................... 47/46 |
| 5,081,746 | 1/1992 | Czwartacki ............................. 24/17 B |
| 5,301,696 | 4/1994 | Revson ................................... 132/273 |
| 5,379,782 | 1/1995 | Tabb ....................................... 132/275 |
| 5,459,905 | 10/1995 | Voyre ..................................... 24/17 B |
| 5,655,224 | 8/1997 | Sears ........................................ 2/171 |
| 5,758,671 | 6/1998 | Thim ...................................... 132/273 |
| 5,893,376 | 4/1999 | Glassberg .............................. 132/273 |
| 5,920,909 | 7/1999 | Ellsworth et al. ........................... 2/71 |

FOREIGN PATENT DOCUMENTS

| | | |
|---|---|---|
| 1287485 | 1/1961 | France . |
| 536496 | 10/1931 | Germany . |
| 14910 | of 1907 | United Kingdom . |

*Primary Examiner*—Michael J. Carone
*Assistant Examiner*—Jeff Gellner
*Attorney, Agent, or Firm*—Swabey Ogilvy Renault

[57] ABSTRACT

A plant tie for securing a plant limb of a plant to a supporting member, for example, a plant stake, comprises a soft flexible, elastic loop; more especially the loop is of knitted material and is in particular formed from a toe clip remnant of knitted hosiery manufacture.

18 Claims, 4 Drawing Sheets

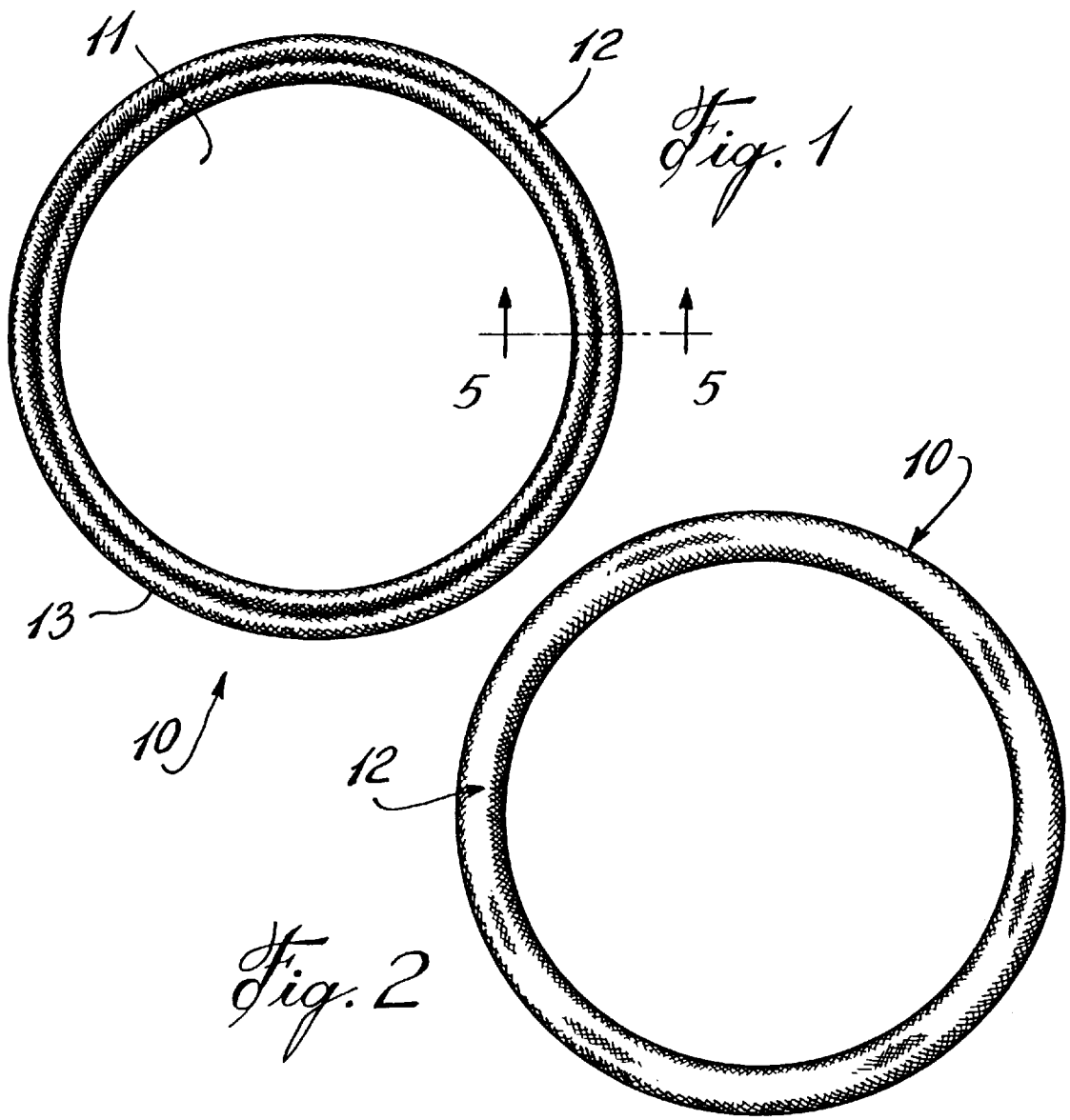
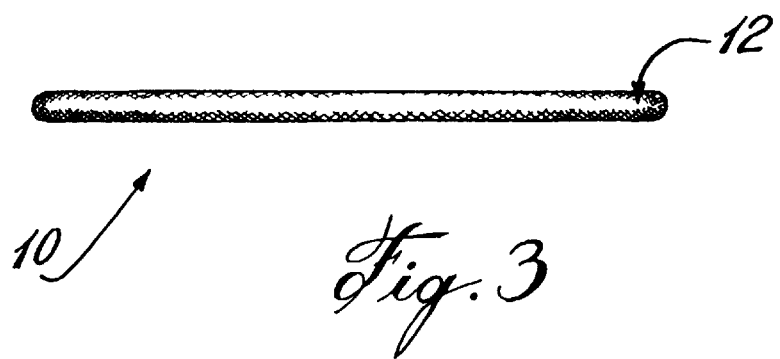

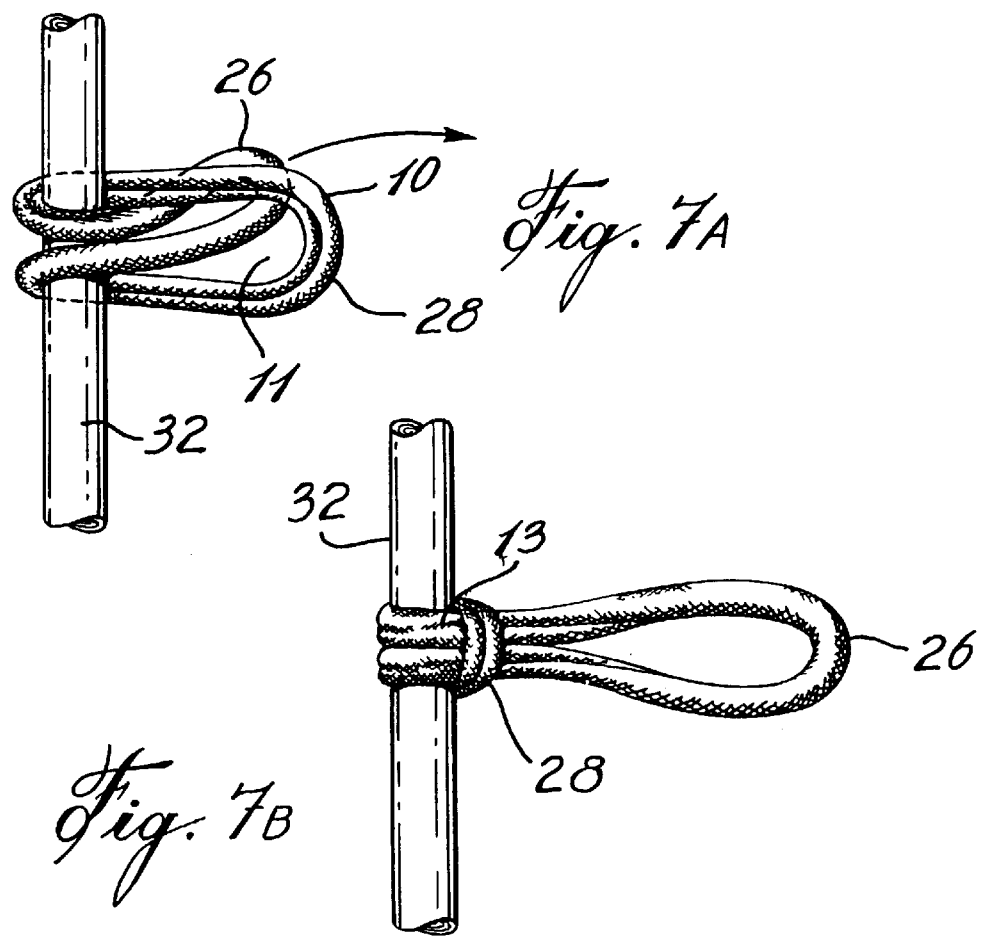
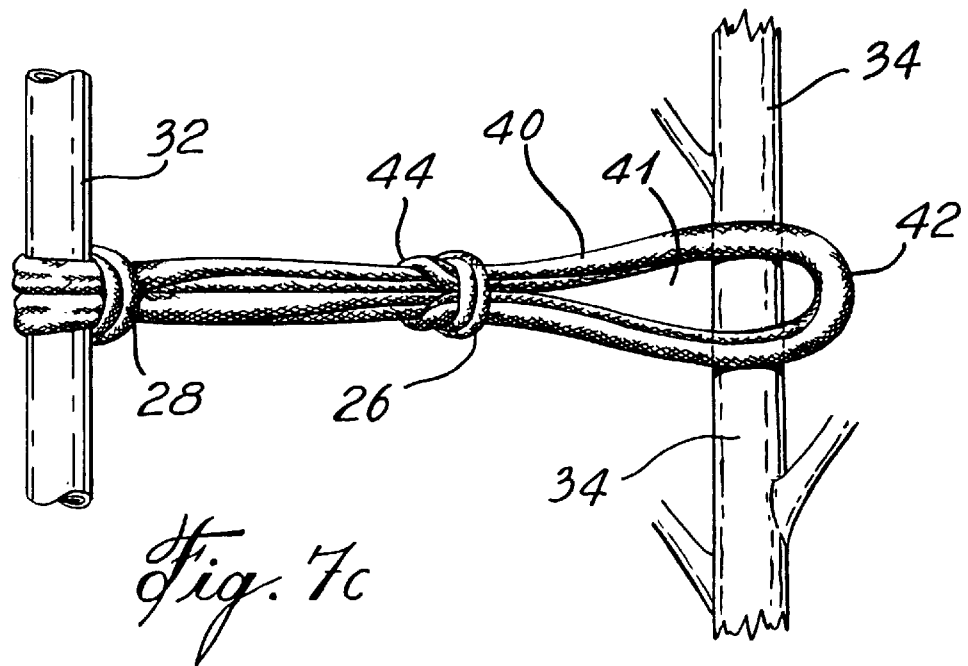

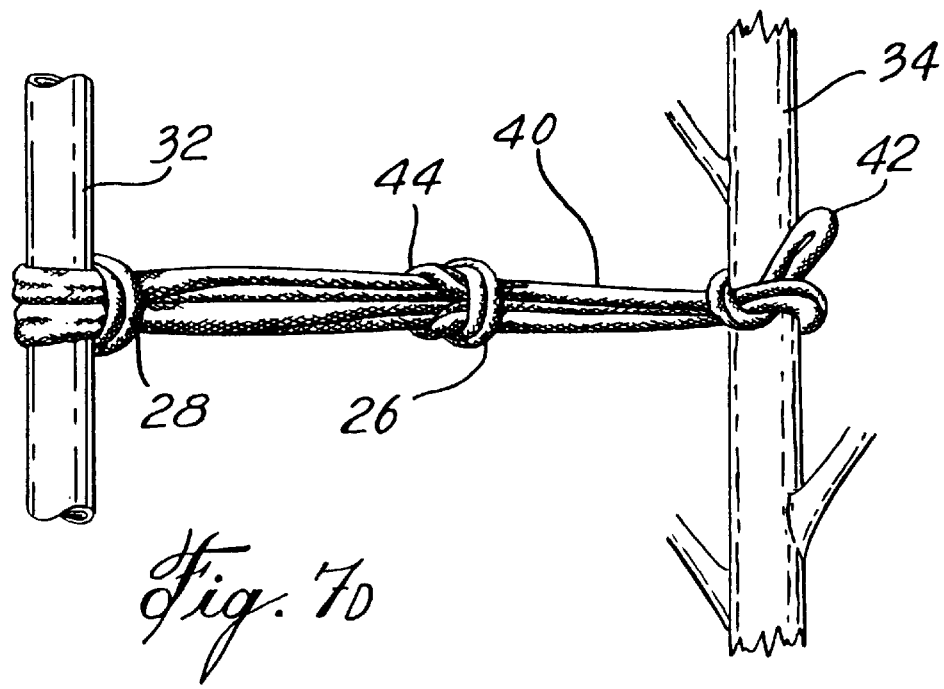
Fig. 7D
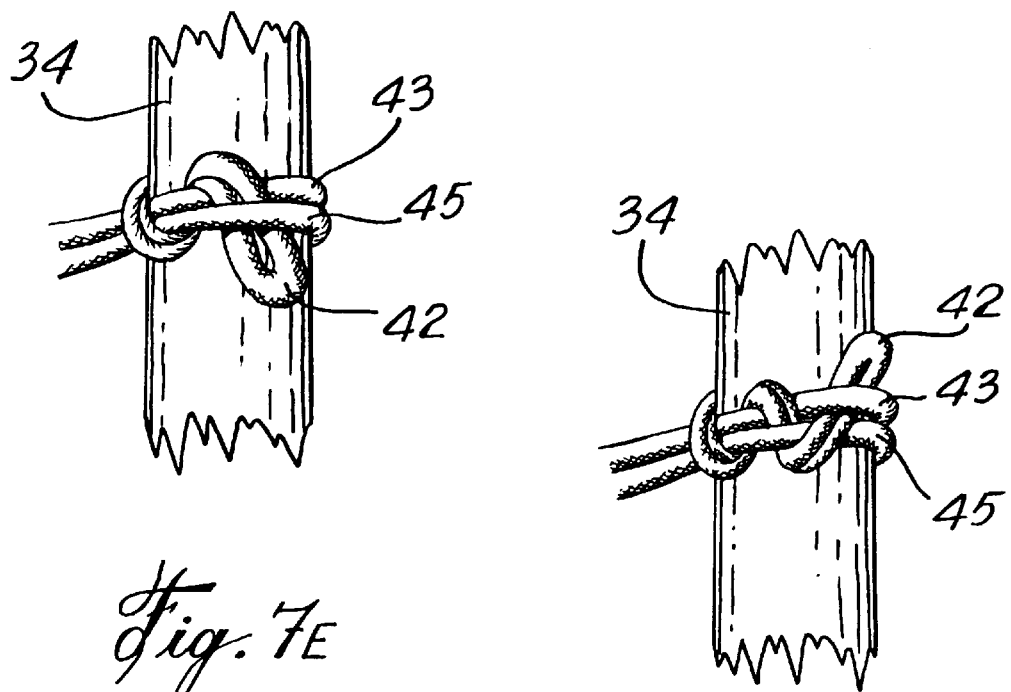
Fig. 7E
Fig. 7F

PLANT TIE AND METHOD

BACKGROUND OF THE INVENTION i) Field of the Invention

This invention relates to a plant tie for securing a plant limb of the plant to a supporting member such as a plant stake and to a method of securing a plant limb of a plant to a supporting member with a plant tie; more especially the invention is concerned with such a plant tie which permits a limited mobility of the plant limb relative to the supporting member.

ii) Description of Prior Art

During growth of many plants, it is necessary to support a limb of the plant to a supporting member, for example, a plant stake, wire or trellis. This is especially important in plants which have a significant growth height relative to supporting strength of the stem of the plant, particularly under the weight of growing fruit, blooms or foliage which the plant stem supports. Plants of this type include vines such as tomato plants. Typically a limb of the plant, which limb may be the plant stem, stalk or trunk or a branch from the stem, stalk or trunk is fastened to a vertical support stake with a plant tie. Widely employed plant ties include lengths of twine which are wrapped and knotted about the stake and the plant limb, and a stiff but flexible plastic tape which may have a thin wire core.

These widely employed plant ties have the major disadvantage that they resist growth of the plant limb which under normal growth enlarges and they also restrict mobility of the plant limb relative to the stake.

Prior proposals to overcome this disadvantage have been relatively complex. U.S. Pat. No. 3,875,620 Wells et al describes an automatically expansible tie having elements which rupture under tension allowing expansion to accommodate plant growth.

British Patent 14,910 describes a plant tie comprising a strip of metal wire which is coiled or corrugated to permit expansion by opening of the coils. German Patent 536,496 employs a metal band and French Patent 1,287,485 shows a fastening device.

There is ongoing and increasing interest in finding uses for waste materials developed in manufacturing processes, in view of both disposal concerns, including environmental concerns and economic and resource concerns.

In the manufacture of knitted hosiery, for example, pantyhose, tights and stockings, a toe portion of the garment is sewn in a knitted tubular element which generally forms a leg portion and foot portion of the hosiery garment. The sewing of the toe portion results in removal of an end portion of the tubular element, and this remnant is referred to in the hosiery industry as a toe clip. The toe clip is typically a band which in a circular state has a diameter of about 2.75 inches (7 cm) and a band width (relaxed) of about 0.7 inches (18 mm). This toe clip remnant is a waste product which must be discarded.

SUMMARY OF THE INVETION

It is an object of this invention to provide a novel plant tie.

It is a further object of this invention to provide a method of securing a plant limb of a plant to a supporting member, with a plant tie.

It is a particular object of this invention to provide such a plant tie which allows a limited mobility of the plant lamb relative to the supporting member.

In accordance with one aspect of the invention there is provided a plant tie for securing a plant limb of plant to a supporting member comprising a soft, flexible, elastic loop.

In accordance with another aspect of the invention there is provided in a method of securing a plant limb of a plant to a supporting member in which the supporting member is disposed in proximity to said plant limb, and the supporting member and plant limb are interconnected with a plant tie, the improvement in which the plant tie comprises a soft, flexible, elastic loop.

In still another aspect of the invention there is provided a method of securing a plant limb of a plant to a supporting member while permitting a limited mobility of the plant limb relative to the supporting member comprising: a) providing a supporting member in a supporting configuration in proximity to the plant; b) providing at least one soft, flexible, elastic loop, each said at least one loop having a relaxed elongate configuration with opposed elongate lengths of the loop in adjacent relationship and terminating at opposed first and second loop ends; c) feeding a first loop end of a said loop about a first member selected from said supporting member and said plant limb, and drawing said first end through said loop and away from said first member while retracting said second loop end toward said first member to secure said loop to said first member; d) feeding a second loop end, stretchably connected to said first loop end, about a second member, different from said first member, and selected from said supporting member and said plant limb, and e) securing said second loop end to said second member.

In this Specification the terms plant and plant limb are to be understood as referring to vegetation generally including flowering and non-flowering plants and bushes, fruit bearing plants and bushes and trees such vegetation having a character whereby support of limbs of the vegetation by a supporting member is advantageous.

DESCRIPTION OF PREFERRED EMBODIMENTS

The plant loop of the invention more especially consists of a continuous loop of knitted material which suitably has a denier of 20 to 100 denier.

An especially suitable knitted material is a remnant of knitted hosiery manufacture known as a toe clip, which is formed from an end of a tube of the knitted hosiery material when a toe portion is sewn at such end.

Typically this knitted hosiery material is of synthetic yarn or thread such as nylon but may be of other synthetic or non-synthetic knittable material having characteristics similar to nylon.

Conveniently the remnant or the loop formed therefrom is dyed a colour such as green which will blend in with the plant environment.

The knitted hosiery remnant is formed as a band, the woven nature of the band renders it flexible, elastic and soft, pliable or compressible.

The loop is formed from the remnant band by a simple rolling operation applied to the band wall; this rolling may be manually performed or performed by a machine.

The rolling produces a pair of adjacent coiled portions.

In particular the remnant band of hosiery material has a band wall terminating in first and second circumferential band edges. A first band zone extends from the first edge to a central circumferential axis of the band, and a second band zone extends from the second edge to the central circumferential axis. The first and second zones are coiled to form the first and second coiled portions of the loop.

The loop has a relaxed state and a fully stretched state, as well as a plurality of partially stretched or non-fully stretched states intermediate or between the relaxed state and the fully stretched state. Being flexible the loop can be formed into a variety of configurations. The elastic nature of the loop can be defined by reference to one such configuration in the relaxed state. In a relaxed elongate configuration, in which opposed lengths are generally straight and parallel, and in adjacent contacting relationship, with the opposed lengths terminating at opposed loop ends or folds, such relaxed elongate configuration is stretchable to a fully stretched elongate configuration in which the opposed lengths remain in adjacent contacting relationship, the ratio of the fully stretched elongate configuration to the length of the relaxed elongate configuration being 1.8 to 2.2:1.

The elastic nature of the loop permits mobility of the plant limb relative to the stake or other supporting member, in response to forces acting on the limb, such as the wind or internal forces resulting from plant growth. In this way limited movement whereby the plant limb may move both towards the stake or away from the stake can be accommodated. This is not the case with twine or flexible tape plant ties which have no elasticity.

Additionally the elastic nature of the material of the loop allows expansion of the portions of the loop surrounding the plant limb, in response to enlargement of the limb as it grows.

In this way the loop does not restrict or hinder growth of the plant and does not subject plant to stress since it can readily accommodate tension forces resulting from growth of the plant and from the environment.

The soft, pliable, compressible nature of the textile material forming the loop is free of hard or sharp edges which might damage the plant during growth, and these characteristics are enhanced by the coiled zones of the loop.

BRIEF DESCRIPTION OF DRAWINGS

FIG. 1 is a top plan of a plant tie of the invention in a relaxed, circular configuration;

FIG. 2 is a bottom plan of FIG. 1;

FIG. 3 is a side view of FIG. 1;

FIG. 7A illustrates a first step of securement of a plant tie of FIG. 1 to a plant stake;

FIG. 7B illustrates a step following that of FIG. 7A in which the plant tie is secured to the plant stake;

FIG. 7C illustrates a subsequent step, whereby a second plant tie is secured to the free end of the first plant tie; and FIGS. 7D, 7E and 7F illustrate the subsequent steps in which the free end of the second plant tie is tied to the plant stem.

DESCRIPTION OF PREFERRED EMBODIMENT WITH REFERENCE TO THE DRAWINGS

Figure 4:
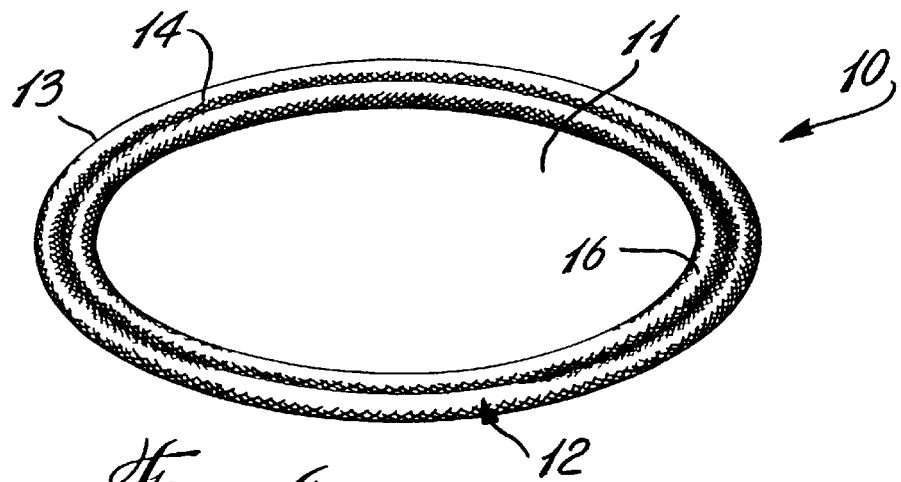
FIG. 4 is a perspective view of FIG. 1.

With further reference to FIGS. 1 to 5, plant tie 10 is formed of knitted hosiery material 12 and has coiled portions 14 and 16.

Plant tie 10 has a continuous wall 13 and an aperture 11 defined between opposed faces of wall 13.

Figure 5:
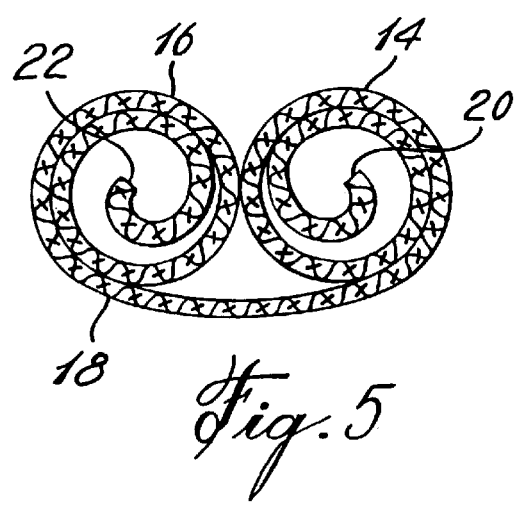
FIG. 5 is a cross-section on line 5—5 of FIG. 1.

With particular reference to FIG. 5, the coiled portions 14 and 16 are formed in band wall 18. A circumferential edge 20 of band wall 18 forms an inner free end of coiled portion 14 and a circumferential edge 22 of band wall 18 forms an inner free end of coiled portion 16.

In FIGS. 1 to 4, plant tie 10 is more particularly shown in a circular configuration, however, being soft, flexible and elastic it can assume numerous configurations.

Figure 6A:
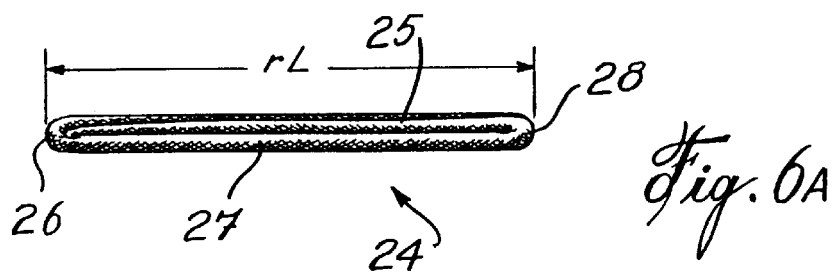
FIG. 6A is a top view of the plant tie of FIG. 1, in an elongate, relaxed configuration.

With further reference to FIG. 6A, plant tie 10 is shown in an elongate, relaxed configuration having opposed elongate lengths 25 and 27 which terminate at opposed first and second ends 26 and 28. The elongate, relaxed configuration 24 of plant tie 10 has an elongate length r1.

Figure 6B:
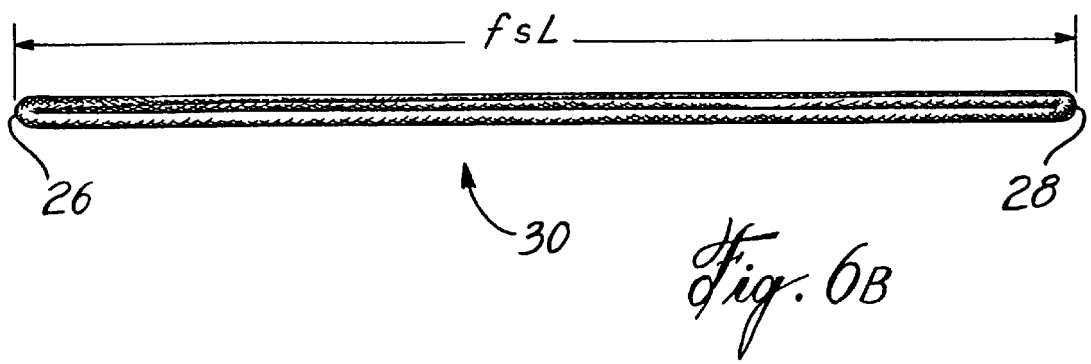
FIG. 6B is a view similar to FIG. 6A showing the plant tie in the elongate, fully stretched configuration.

With further reference to FIG. 6B, plant tie 10 is shown in an elongate, fully stretched configuration 30 in which opposed elongate stretched lengths 29 and 31 (derived from relaxed lengths 25 and 27, respectively) terminate at first and second ends 26 and 28 respectively. The plant tie 10 in the elongate fully stretched configuration 30 has an elongate length fs1.

In general length fs1 is approximately twice length r1, and more especially the ratio of fs1 to r1 is 1.8 to 2.2:1.

It will be understood that plant tie 10 is readily stretched from the relaxed configuration such as illustrated in FIG. 6A to the fully stretched configuration such as illustrated in FIG. 6B with various levels of stretch therebetween, and when the force creating the stretch is released the plant tie is restored to its relaxed state, or if the force is only partially released, it retracts to some intermediate state between the stretched state and the relaxed state. In this way the plant tie 10 interconnecting a plant stake and a plant limb can accommodate limited movement of the plant limb relative to the plant stake by passing through stages between the relaxed state and the fully stretched state.

With further reference to FIGS. 7A to 7F, there is illustrated schematically the steps of a method whereby a plant stem 34 may be secured to a plant stake 32 in accordance with the invention.

In a first step of the method illustrated in FIG. 7A, a first end 26 of plant tie 10 is passed about plant stake 32 and drawn through the aperture 11. As first end 26 is drawn through aperture 11, second end 28 is drawn into engagement with wall 13 of plant tie 10 at plant stake 32 as illustrated in FIG. 7B. In this way, the plant tie 10 is secured to plant stake 32. In the method illustrated in FIGS. 7A to 7F a second plant tie 40 of the same form as plant tie 10 is then secured to plant tie 10. A first end 42 of plant tie 40 is fed through aperture 11 about the free first end 26 of plant tie 10 and is then drawn through the aperture 41 of plant tie 40, and is drawn away from end 26 of plant tie 10 until second end 44 of plant tie 40 engages first end 26 of plant tie 10 as illustrated in FIG. 7C. The first end 42 of plant tie 40 is then tied, for example, by a simple knot to plant stem 34, such as by the sequence of steps illustrated in FIGS. 7D to 7F.

As seen in FIG. 7D a first end 42 is passed around stem 34 and through aperture 41. As seen in FIG. 7E, first end 42 is fed between opposed walls 43 and 45. As seen in FIG. 7F, first end 42 is fed over wall 45 and between wall 43 and stem 34.

It will be understood that instead of employing two plant ties 10 and 40 as illustrated in FIGS. 7A to 7D, the method could be carried out solely with one plant tie, namely, plant tie 10, in which case the first end 26 of plant tie 10 would be fastened to the plant stem 34, or additional plant ties could be secured successively to extend the linkage. Thus, while two linkages formed by plant ties 10 and 40 are illustrated in FIGS. 7C and 7D, these could be extended employing the same procedure described and illustrated for FIG. 7C to add additional plant ties.

It will be understood that various variations might be made employing the spirit of the invention without departing from the invention.

I claim:

1. A plant tie for securing a plant limb of a plant to a supporting member comprising a soft, flexible, elastic loop, said loop being a continuous loop of a material consisting of knitted material having a denier of 20 to 100, wherein said loop has first and second coiled portions and is derived from a band having first and second circumferential edges, a first band zone extending from said first edge to a central circumferential axis of said band and a second band zone extending from said second edge to said central circumferential axis, said first and second zones being coiled to form said first and second coiled portions.

2. A plant tie according to claim 1, wherein said band is a remnant of knitted hosiery manufacture.

3. A plant tie according to claim 2, wherein said remnant is knitted nylon.

4. A plant tie according to claim 3, wherein said remnant is a toe clip.

5. A plant tie according to claim 4, wherein said loop has a relaxed state, a fully stretched state and a plurality of non-fully stretched states therebetween and has an elasticity such that in a relaxed elongate configuration, in said relaxed state, with opposed lengths of the loop in adjacent contacting relationship, said opposed lengths terminating at opposed first and second loop ends, said relaxed elongate configuration is stretchable to a fully stretched elongate configuration in which said opposed lengths remain in adjacent contacting relationship, the ratio of the length of the fully stretched elongate configuration to the length of the relaxed elongate configuration being 1.8 to 2.2:1.

6. A plant tie for securing a plant limb of a plant to a supporting member, comprising a soft, flexible, elastic loop wherein said loop is formed from a toe clip remnant of knitted hosiery manufacture.

7. A plant tie according to claim 6, wherein said loop is a continuous loop of material consisting of knitted material having a denier of 20 to 100.

8. A plant tie according to claim 6, wherein said loop has a relaxed state, a fully stretched state and a plurality of non-fully stretched states therebetween and has an elasticity such that in a relaxed elongate configuration, in said relaxed state, with opposed lengths of the loop in adjacent contacting relationship, said opposed lengths terminating at opposed first and second loop ends, said relaxed elongate configuration is stretchable to a fully stretched elongate configuration in which said opposed lengths remain in adjacent contacting relationship, the ratio of the length of the fully stretched elongate configuration to the length of the relaxed elongate configuration being 1.8 to 2.2:1.

9. A plant tie according to claim 6, wherein said remnant is of nylon and is dyed green to blend with the plant.

10. In a method of securing a plant limb of a plant to a supporting member in which the supporting member is disposed in proximity to said plant limb, and the supporting member and plant limb are interconnected with a plant tie, the improvement in which the plant tie consists of a soft, flexible, continuous, endless elastic loop.

11. In a method for securing a plant limb of a plant to a supporting member in which the supporting member is disposed in proximity to said plant limb, and the supporting member and plant limb are interconnected with a plant tie, the improvement in which the plant tie comprises a soft, flexible elastic loop, wherein said loop is a continuous loop consisting of knitted hosiery material having a denier of 20 to 100, said loop being derived from a remnant band of knitted hosiery manufacture.

12. A method according to claim 11, wherein said loop has first and second coiled portions, said band having first and second circumferential edges, a first band zone extending from said first edge to a central circumferential axis of said band and a second band zone extending from said second edge to said central circumferential axis, said first and second zones being coiled to form said first and second coiled portions.

13. A method according to claim 12, wherein said remnant is a nylon toe clip from hosiery manufacture and is dyed green to blend with the plant; and said loop has a relaxed state, a fully stretched state and a plurality of non-fully stretched states therebetween and has an elasticity such that in a relaxed elongate configuration in said relaxed state, with opposed lengths of the loop in adjacent contacting relationship, said opposed lengths terminating at opposed first and second loop ends, said relaxed elongate configuration is stretchable to a fully stretched elongate configuration in which said opposed lengths remain in adjacent contacting relationship, the ratio of the length of the fully stretched elongate configuration to the length of the relaxed elongate configuration being 1.8 to 2.2:1.

14. A method of securing a plant limb of a plant to a supporting member while permitting a limited mobility of the plant limb relative to the supporting member comprising:

a) providing a supporting member in a supporting configuration in proximity to the plant, b) providing at least one soft, flexible, elastic loop, each said at least one loop having a relaxed elongate configuration with opposed elongate lengths of the loop in adjacent relationship and terminating at opposed first and second loop ends, c) feeding a first loop end of a said loop about a first member selected from said supporting member and said plant limb, and drawing said first end through said loop and away from said first member while retracting said second loop end toward said first member to secure said loop to said first member, d) feeding a second loop end, stretchably connected to said first loop end, about a second member, different from said first member, and selected from said supporting member and said plant limb, and e) securing said second loop end to said second member.

15. A method according to claim 14, further including linking at least a second loop to said loop in step c), said loop in step c) being a first loop, by a step f) subsequent to step c) and prior to step d), step f) comprising feeding a first loop end of said second loop about said first end of said first loop and drawing said first loop end of said second loop through said second loop and away from said first loop while retracting said second loop end of said second loop toward said first loop to secure said second loop to said first loop.

16. A method according to claim 15, wherein said second loop end in step d) is said first loop end of said second loop.

17. A method according to claim 14, wherein each said loop is a continuous loop consisting of knitted hosiery material having a denier of 20 to 100, said loop being derived from a remnant band of knitted hosiery manufacture, each said loop has first and second coiled portions, said band having first and second circumferential edges, a first band zone extending from said first edge to a central circumferential axis of said band and a second band zone extending from said second edge to said central circumferential axis, said first and second zones being coiled to form said first and second coiled portions.

18. A method according to claim 17, wherein said remnant is a nylon toe clip from hosiery manufacture and is dyed green to blend with the plant; and said loop has a relaxed state, a fully stretched state and a plurality of non-fully stretched states therebetween and has an elasticity such that in a relaxed elongate configuration in said relaxed state, with opposed lengths of the loop in adjacent contacting relationship, said opposed lengths terminating at opposed first and second loop ends, said relaxed elongate configuration is stretchable to a fully stretched elongate configuration in which said opposed lengths remain in adjacent contacting relationship, the ratio of the length of the fully stretched elongate configuration to the length of the relaxed elongate configuration being 1.8 to 2.2:1.

* * * * *